United States Patent
Acharya et al.

(10) Patent No.: US 9,252,633 B2
(45) Date of Patent: Feb. 2, 2016

(54) SYSTEM AND METHOD FOR ACCELERATED ASSESSMENT OF OPERATIONAL UNCERTAINTIES IN ELECTRICAL POWER DISTRIBUTION SYSTEMS

(71) Applicant: General Electric Company, Schenectady, NY (US)

(72) Inventors: Naresh Acharya, Niskayuna, NY (US); Jovan Z. Bebic, Clifton Park, NY (US); Harjeet Johal, Glenville, NY (US); Kathleen Ann O'Brien, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 482 days.

(21) Appl. No.: 13/724,928

(22) Filed: Dec. 21, 2012

(65) Prior Publication Data
US 2014/0180663 A1    Jun. 26, 2014

(51) Int. Cl.
G06F 17/50    (2006.01)
H02J 13/00    (2006.01)
H02J 3/00    (2006.01)

(52) U.S. Cl.
CPC ......... H02J 13/001 (2013.01); H02J 2003/007 (2013.01); Y02E 60/76 (2013.01); Y04S 40/22 (2013.01)

(58) Field of Classification Search
None
See application file for complete search history.

(56) References Cited

U.S. PATENT DOCUMENTS

| | | | |
|---|---|---|---|
| 5,692,158 A * | 11/1997 | Degeneff et al. | 703/2 |
| 7,216,309 B2 | 5/2007 | Lee et al. | |
| 7,487,078 B1 | 2/2009 | Phillips et al. | |
| 7,590,518 B2 | 9/2009 | Phillips | |
| 7,848,911 B2 | 12/2010 | Plesant | |
| 8,315,742 B2 * | 11/2012 | Patel | 700/286 |
| 8,756,047 B2 * | 6/2014 | Patel | 703/18 |
| 2006/0080068 A1 | 4/2006 | Feldmann et al. | |
| 2008/0072182 A1 | 3/2008 | He et al. | |
| 2010/0205572 A1 | 8/2010 | Dai et al. | |

OTHER PUBLICATIONS

Hockenberry, "Evaluation of uncertainty in dynamic, reduced-order power system models", Doctoral dissertation, Massachusetts Institute of Technology, Sep. 2000, 213 pages.*

(Continued)

*Primary Examiner* — Omar Fernandez Rivas
*Assistant Examiner* — Herng-Der Day
(74) *Attorney, Agent, or Firm* — Francis T. Coppa (57) ABSTRACT

A system for accelerated assessment of operational uncertainties in an electrical power distribution system includes a plurality of utility assets, and a distribution analysis ("DA") system. DA system includes a preparation module configured to identify a first network model and a reduced network model for the electrical power distribution system. DA system also includes an input module configured to identify a plurality of scenarios, and a reduced-model-analysis module configured to analyze the reduced network model using the plurality of scenarios, generating a first set of results, and to select a subset of scenarios based on the first set of results. DA system further includes a full-model-analysis module configured to analyze the first network model using the subset of scenarios, generating a second set of results. DA system also includes a command module configured to dispatch configuration commands to utility assets based on the second set of results.

22 Claims, 10 Drawing Sheets

(56) References Cited

OTHER PUBLICATIONS

Martino et al., "Model Reduction of Distribution Networks with Dispersed Generation", CIRED—17th International Conference on Electricity Distribution, May 12-15, 2003, Location: Barcelona.

Lee et al., "Interconnect Modeling and Sensitivity Analysis using Adjoint Networks Reduction Technique", Proceedings of the 2003 International Symposium on Circuits and Systems (ISCAS '03), vol. 4, pp. IV-648-IV-651, May 25-28, 2003.

Bernhard et al., "Reduced Models for Operation Management of Distributed Generation", CIRED 20th International Conference and Exhibition on Electricity Distribution, pp. 1-4, Jun. 8-11, 2009.

Antoulas et al., "Model Order Reduction for Multi-terminal Systems with Applications to Circuit Simulation", Eindhoven University of Technology, Sep. 26, 2011.

Hockenberry, James et al., Evaluation of Uncertainty in Dynamic, Simulations of Power Systems Models: The Probabilistic Collecation Method, IEEE, pp. 1483-1491, vol. 19, No. 3, Aug. 2004.

* cited by examiner

SYSTEM AND METHOD FOR ACCELERATED ASSESSMENT OF OPERATIONAL UNCERTAINTIES IN ELECTRICAL POWER DISTRIBUTION SYSTEMS

BACKGROUND

The embodiments described herein relate generally to electrical power distribution systems and, more particularly, to techniques for accelerated assessment of operational uncertainties in electrical power distribution systems.

Known electric power grids typically include power generation plants, transmission and distribution lines, transformers, and other devices that facilitate electric power transmission, and power delivery. After electric power is generated in the generating plants, it is transmitted for extended distances through the high voltage transmission lines to sub-transmission/distribution substations. From the substations, power is then transmitted through a feeder to an end customer through an electrical power distribution system.

Most known electrical power distribution systems include a plurality of feeders coupled to the substation transformer. The electrical power distribution systems may also include at least one capacitor bank, at least one voltage regulator, and at least one distributed generation (DG) device, e.g., a diesel generator and a photovoltaic source. The feeder is divided into smaller units via bus-bars, disconnect switches, reclosers, sectionalizers, and fuses, wherein such smaller units are referred to as segments. Each segment may have any number of DG devices coupled thereto.

The distribution networks now often include multiple power sources due to an increase in DG. The recent proliferation of wind and solar power sources, for example, has added significant complexity to the management of electrical power distribution systems. Not only do these generators represent power sources within the distribution network, but generators such as wind and solar farms represent a less predictable source of power. Their outputs change with weather patterns, a variable controlled by nature. This variability adds a complexity to analyzing electrical power distribution systems.

Known mathematical modeling techniques are typically used to model and analyze electrical circuits. As circuits get larger and more complex, modeling analysis of electrical circuits becomes significantly more complex as well. In modeling electrical power distribution systems with DG, full-model analysis can become computationally intensive and infeasible to adequately support the decision-making needs of system operations managers.

BRIEF DESCRIPTION

In one aspect, a system for accelerated assessment of operational uncertainties in an electrical power distribution system is provided. The system includes a plurality of utility assets. The system also includes a distribution analysis system comprising a preparation module configured to identify a first network model and a reduced network model for the electrical power distribution system. The system further includes an input module configured to identify a plurality of scenarios. The system also includes a reduced-model-analysis module configured to analyze the reduced network model using the plurality of scenarios, generating a first set of results, and to select a subset of scenarios from the plurality of scenarios at least partially based on the first set of results. The system further includes a full-model-analysis module configured to analyze the first network model using the subset of scenarios, generating a second set of results. The system also includes a command module configured to dispatch at least one configuration command to at least one of the plurality of assets at least partially based on the second set of results.

In a further aspect, a method of accelerated assessment of operational uncertainties in an electrical power distribution system is provided. The electrical power distribution system includes a plurality of utility assets. The method includes identifying a first network model and a reduced network model for an electrical power distribution system. The method also includes identifying a plurality of scenarios. The method further includes analyzing the reduced network model using the plurality of scenarios, and selecting a subset of scenarios from the plurality of scenarios to generate a first set of results. The method also includes analyzing the first network model using the subset of scenarios to generate a second set of results. The method further includes dispatching at least one configuration command to at least one utility asset at least partially based on the second set of results.

In another aspect, a method for accelerated assessment of operational uncertainties in an electrical power distribution system is provided. The electrical power distribution system includes a plurality of utility assets. The method includes identifying a reduced network model for the electrical power distribution system. The method also includes identifying a plurality of scenarios. The method further includes analyzing the reduced network model using the plurality of scenarios, and generating a first set of results. The method also includes executing a configuration change within the electrical power distribution system based at least in part on the first set of results.

DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "operator" includes any person in any capacity associated with operating and maintaining electric distribution system, including, without limitation, users of the systems described herein, shift operations personnel, maintenance technicians, and system supervisors.

A power network is traditionally thought of as having a transmission network and one or more distribution networks. As used herein, the terms "power distribution system," "distribution system," "power distribution network," and "distribution network" are used synonymously throughout, and are meant to refer generally to that part of the network with lower voltage, localized, numerous small to medium consumers, and normally separated from the transmission part of the power network by an electrical substation.

As used herein, the terms "scenario" and "scenarios" are used, generally, to refer to situational variables or conditions that may occur within electrical power distribution system, and the terms are used more specifically to refer to those variables or conditions as the inputs to the model analysis systems and methods described herein.

As used herein, the term "utility asset" refers to electrical components that facilitate electric power delivery in an electrical power distribution system, such as, without limitation, distribution lines, transformers, capacitor banks, voltage regulators, switches, and distributed power generators, such as, without limitation, diesel generators, coal plants, photovoltaic farms, and wind farms.

As used herein, the term "bus" refers, generally, to a node within an electrical power distribution network. For example, and without limitation, a "bus" may be a source of load, or a source of power generation. As used herein, the term "line segment" is used to refer to the electrical cabling connecting buses, i.e., each "line segment" is terminated by two or more "buses". As used herein, the terms "line segment", "feeder line", and "section" are used interchangeably.

The exemplary systems and methods described herein overcome disadvantages to known methods of analyzing electrical power distribution systems by greatly reducing the time required to perform scenario-based analysis of network models. More specifically, during operational and planning analysis of electrical power distribution systems, a reduced network model is generated from a full network model, and utilized to analyze numerous scenarios. A reduced network model allows for quicker simulation, because the time required to run a simulation is proportional to the number of buses in the network. The reduction of a full network model to a reduced network model greatly reduces the time needed to simulate scenarios, enabling an operator to investigate numerous scenarios, and facilitates responsiveness required when dealing with faults during real-world operations. The inaccuracies that may have been introduced with the use of reduced network models may be at least partially overcome with a final analysis of a select few scenarios with the full network model. Therefore, use of a reduced network model is more efficient with respect to computational efficiency during systems planning, and enables richer analysis in the more time-critical environment of electrical power distribution systems management.

Figure 1:
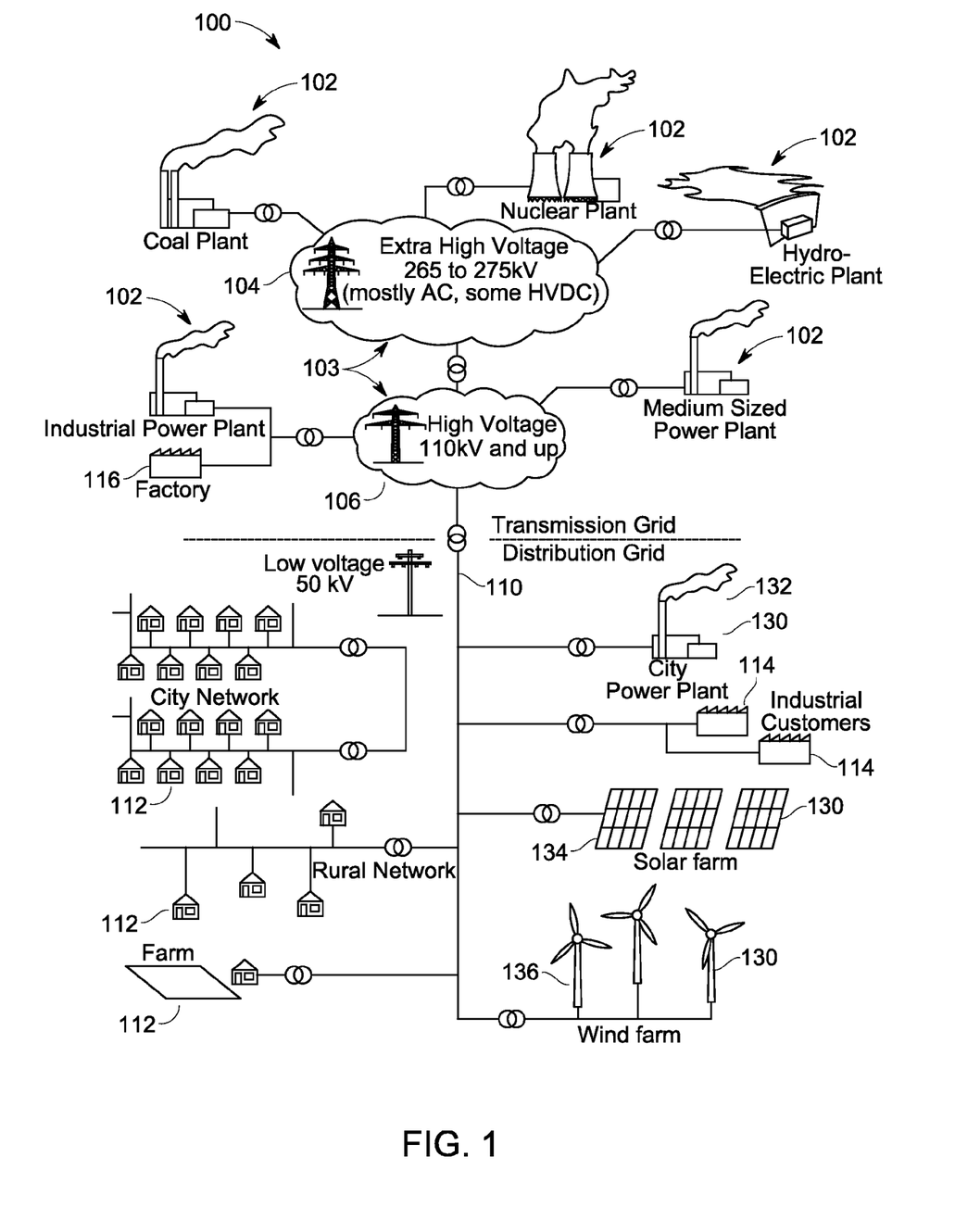
FIG. 1 is a general schematic diagram of both an exemplary transmission network and an exemplary electrical power distribution system with distributed generators (DG)

FIG. 1 is a general schematic diagram of an exemplary electrical power network 100. Electrical power network 100 typically includes power plants 102 outputting power through a transmission grid 103, which includes an extra high voltage transmission grid 104 and a high voltage transmission grid 106 through which power is transmitted to an exemplary electrical power distribution system 110. Electrical power network 100 may include, without limitation, any number, type and configuration of extra high voltage transmission grids 104, high voltage transmission grids 106, and electrical power distribution systems 110, as well as any number of consumers within electrical power distribution system 110, high voltage transmission grid 106, e.g., greater than 110-265 kilovolts (kV), and extra high voltage grid 104, e.g., greater than 265 kV. Factory 116 is an example of a consumer coupled to high voltage transmission grid 106.

Electrical power distribution system 110 includes low wattage consumers 112 and industrial medium wattage consumers 114. Electrical power distribution system 110 also includes distributed generators 130, including a city power plant 132, a solar farm 134, and a wind farm 136. While electrical power distribution system 110 is shown with an exemplary number and type of distributed generators 130, electrical power distribution system 110 may include any number and type of distributed generators 130, including, without limitation, diesel generators, micro-turbines, solar collector arrays, photo-voltaic arrays, and wind turbines.

Figure 2:
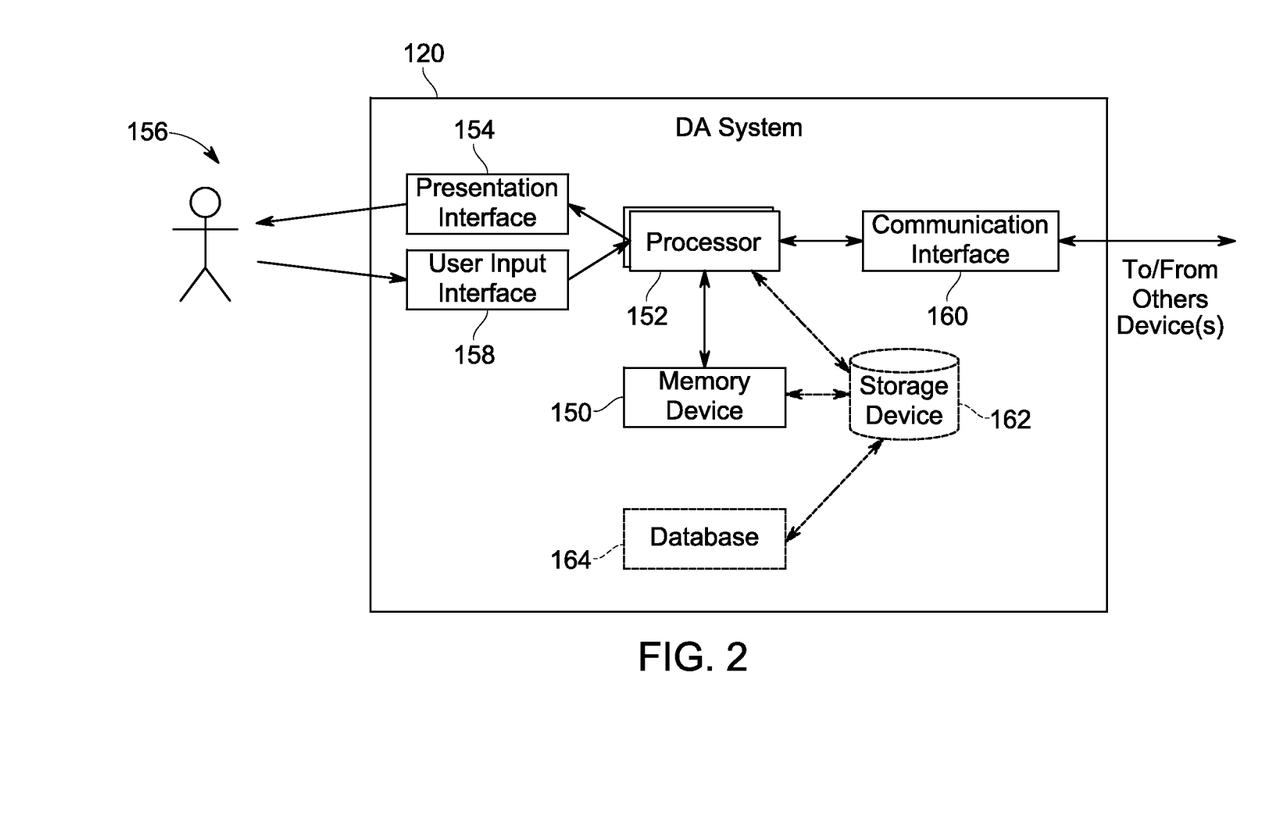
FIG. 2 is a block diagram of an exemplary distribution analysis ("DA") system that may be used to monitor, analyze, and/or control the operation of the electrical power distribution system shown in FIG. 1.

FIG. 2 is a block diagram of an exemplary distribution analysis (DA) system 120 used to analyze electrical power distribution system 110 (shown in FIG. 1). Alternatively, any computer architecture that enables operation of DA system 120 as described herein may be used. DA system 120 facilitates collecting, storing, analyzing, displaying, and transmitting data and operational commands associated with configuration, operation, monitoring and maintenance of components in electrical power distribution system 110.

Also, in the exemplary embodiment, DA system 120 includes a memory device 150 and a processor 152 operatively coupled to memory device 150 for executing instructions. In some embodiments, executable instructions are stored in memory device 150. DA system 120 is configurable to perform one or more operations described herein by programming processor 152. For example, processor 152 may be programmed by encoding an operation as one or more executable instructions and providing the executable instructions in memory device 150. Processor 152 may include one or more processing units, e.g., without limitation, in a multi-core configuration.

Further, in the exemplary embodiment, memory device 150 is one or more devices that enable storage and retrieval of information such as executable instructions and/or other data. Memory device 150 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Also, in the exemplary embodiment, memory device 150 may be configured to store a variety of static operational data associated with components and operational data transmitted from sensing devices (not shown) associated with utility assets in electrical power distribution system 110 including, without limitation, values of electric power transmitted through regulators (not shown in FIG. 2), output values of electric power generators within the distribution network such as, without limitation, solar farm 134 and wind farm 136, bus lengths of individual buses (not shown in FIG. 2), and values of various consumer loads such as, without limitation, low wattage consumers 112 and medium wattage consumers 114.

In some embodiments, DA system 120 includes a presentation interface 154 coupled to processor 152. Presentation interface 154 presents information, such as a user interface and/or an alarm, to a user 156. For example, presentation interface 154 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 154 includes one or more display devices. In addition, or alternatively, presentation interface 154 may include an audio output device (not shown), e.g., an audio adapter and/or a speaker.

In some embodiments, DA system 120 includes a user input interface 158. In the exemplary embodiment, user input interface 158 is coupled to processor 152 and receives input from user 156. User input interface 158 may include, for example, a keyboard, a pointing device, a mouse, a stylus, and/or a touch sensitive panel, e.g., a touch pad or a touch screen. A single component, such as a touch screen, may function as both a display device of presentation interface 154 and user input interface 158.

Further, a communication interface 160 is coupled to processor 152 and is configured to be coupled in communication with one or more other devices, such as, without limitation, components in electrical power distribution system 110, another DA system 120, and any device capable of accessing DA system 120 including, without limitation, a portable laptop computer, a personal digital assistant (PDA), and a smart phone. Communication interface 160 may include, without limitation, a wired network adapter, a wireless network adapter, a mobile telecommunications adapter, a serial communication adapter, and/or a parallel communication adapter. Communication interface 160 may receive data from and/or transmit data to one or more remote devices. For example, a communication interface 160 of one DA system 120 may transmit transaction information to communication interface 160 of another DA system 120. DA system 120 may be web-enabled for remote communications, for example, with a remote desktop computer (not shown).

Also, presentation interface 154 and/or communication interface 160 are both capable of providing information suitable for use with the methods described herein, e.g., to user 156 or another device. Accordingly, presentation interface 154 and communication interface 160 may be referred to as output devices. Similarly, user input interface 158 and communication interface 160 are capable of receiving information suitable for use with the methods described herein and may be referred to as input devices.

Further, processor 152 and/or memory device 150 may also be operatively coupled to a storage device 162. Storage device 162 is any computer-operated hardware suitable for storing and/or retrieving data, such as, but not limited to, data associated with a database 164. In the exemplary embodiment, storage device 162 is integrated in DA system 120. For example, DA system 120 may include one or more hard disk drives as storage device 162. Moreover, for example, storage device 162 may include multiple storage units such as hard disks and/or solid state disks in a redundant array of inexpensive disks (RAID) configuration. Storage device 162 may include a storage area network (SAN), a network attached storage (NAS) system, and/or cloud-based storage. Alternatively, storage device 162 is external to DA system 120 and may be accessed by a storage interface (not shown).

Moreover, in the exemplary embodiment, database 164 contains a variety of static and dynamic operational data associated with components, some of which may be transmitted from sensing devices (not shown) associated with components in electrical power distribution system 110 including, without limitation, values of electric power transmitted through regulators, output values of electric power generators within the distribution network such as, without limitation, solar farm 134 and wind farm 136, bus lengths of individual buses, and values of various consumer loads such as, without limitation, low wattage consumers 112 and medium wattage consumers 114.

The embodiments illustrated and described herein as well as embodiments not specifically described herein but within the scope of aspects of the disclosure, constitute exemplary means for recording, storing, retrieving, and displaying operational data associated with an electrical power distribution system. For example, DA system 120, and any other similar computer device added thereto or included within, when integrated together, include sufficient computer-readable storage media that is/are programmed with sufficient computer-executable instructions to execute processes and techniques with a processor as described herein. Specifically, DA system 120 and any other similar computer device added thereto or included within, when integrated together, constitute an exemplary means for recording, storing, retrieving, and displaying operational data associated with an electrical power distribution system 110.

Figure 3:
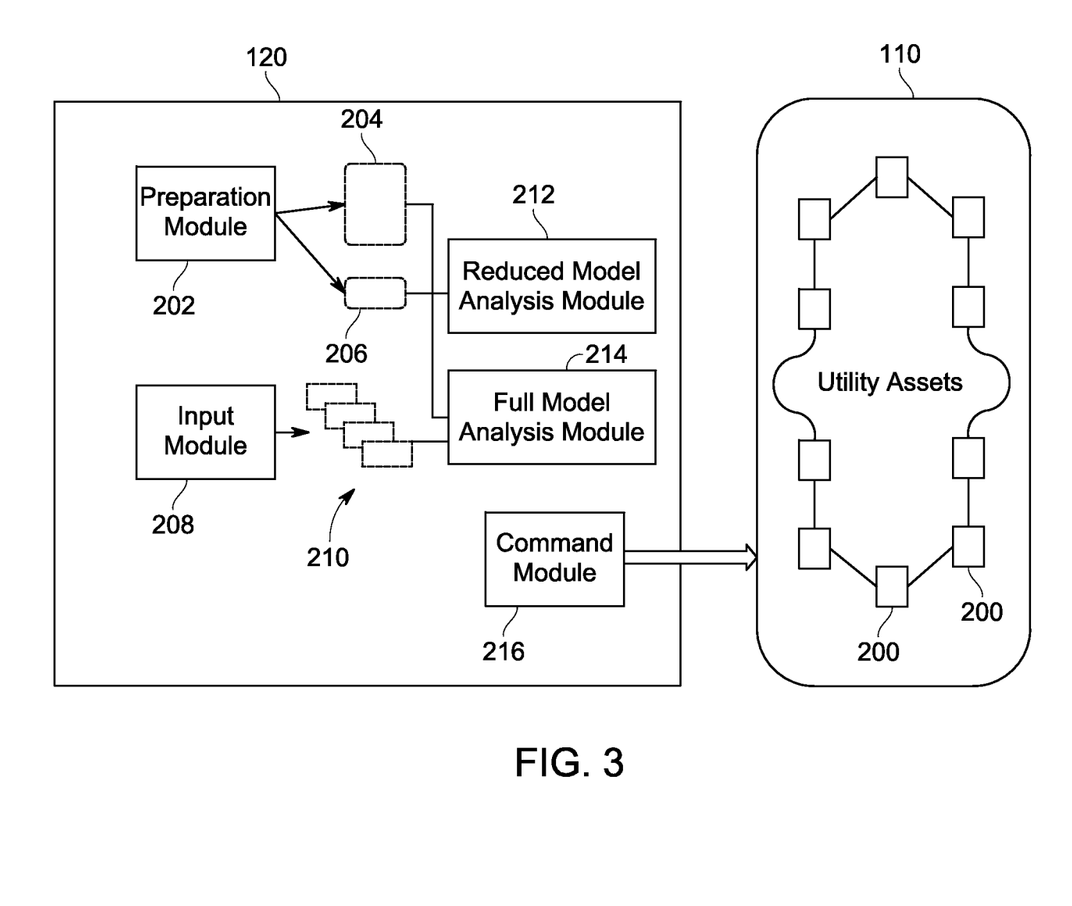
FIG. 3 is a block diagram of the exemplary DA system shown in FIG. 2, used to monitor, analyze, and/or control the operation of the electrical power distribution system shown in FIG. 1.

FIG. 3 is a block diagram of DA system 120 used to monitor, analyze, and/or control the operation of electrical power distribution system 110. Electrical power distribution system 110 includes a plurality of utility assets 200. DA system 120 includes a preparation module 202 that identifies a full network model 204 and a reduced network model 206 for electrical power distribution system 110. Further, DA system 120 includes an input module 208 that identifies a plurality of scenarios 210 for analysis.

Also, in the exemplary embodiment, DA system 120 includes a reduced-model-analysis module 212, a full-model-analysis module 214, and a command module 216. In operation, reduced-model-analysis module 212 analyzes reduced network model 206 using plurality of scenarios 210. Based on the results of the reduced network model 206 analysis, reduced-model-analysis module 212 selects a subset of scenarios for further analysis. Alternatively, full-model-analysis module 214 may select the subset of scenarios for further analysis. Full-model-analysis module 214 then analyzes the subset of scenarios, generating a second set of results. Based on the second set of results, command module 216 dispatches configuration commands to utility assets 200 in electrical power distribution system 110. Operations of DA system 120 are described in greater detail below.

Figure 4:
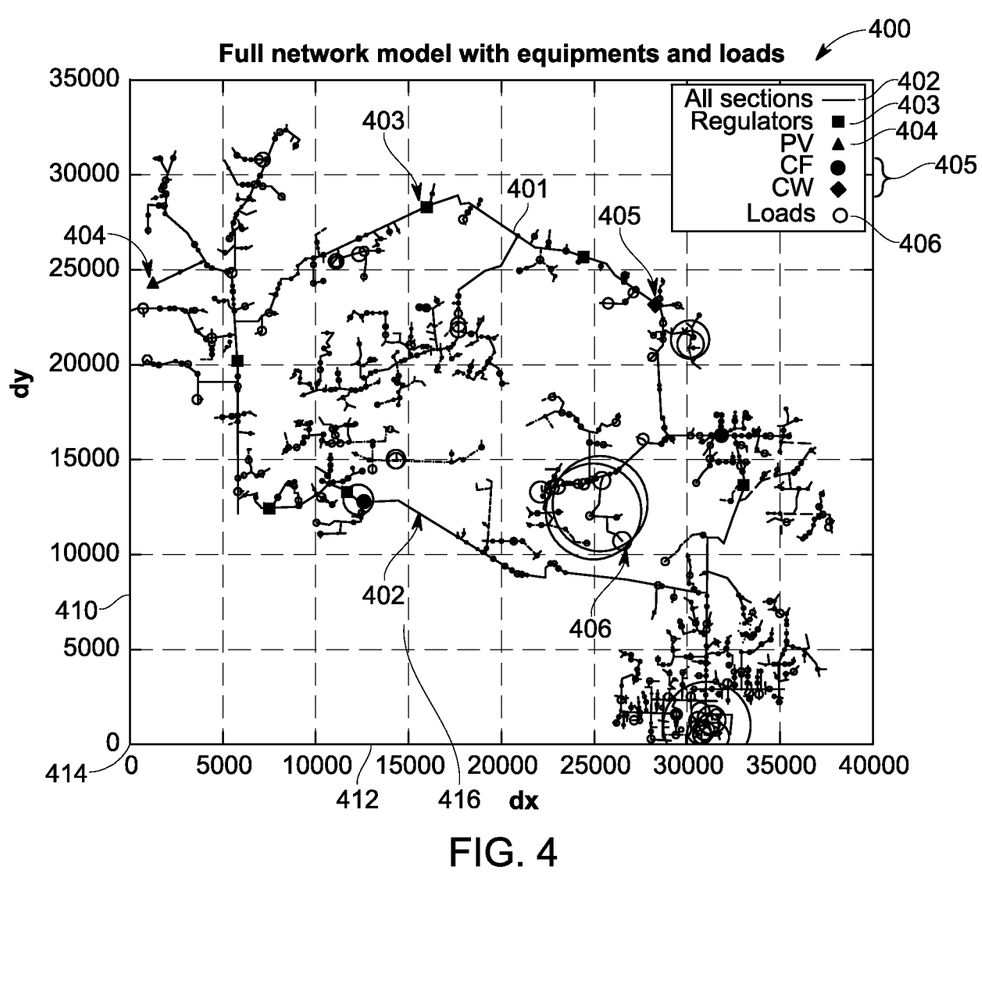
FIG. 4 is a graphical view showing an exemplary full network model for the electrical power distribution system shown in FIG. 1.

FIG. 4 is a graphical view 400 showing an exemplary full network model 401 of electrical power distribution system 110 (shown in FIG. 1). During operation, in the exemplary embodiment, a user 156 (shown in FIG. 2) may view graphical view 400 using presentation interface 154 (shown in FIG. 2), as well as dispatch configuration commands to various devices in electrical power distribution system 110 using user input interface 158 (shown in FIG. 2), facilitated by communication interface 160 (shown in FIG. 2). Full network model 401 is identified by preparation module 202 (shown in FIG. 3).

Graphical view 400 is a visual depiction of electrical power distribution system 110, and is represented as a virtual model existing in memory device 150 of DA system 120 (shown in FIG. 1). Graphical view 400 includes a y-axis 410 and an x-axis 412, both representing distance, in feet, from a point of origin 414 on a Cartesian plane 416 representing a real-world landscape in two dimensions. Full network model 401 includes line segments 402, regulators 403, a photovoltaic power generator 404, capacitors 405, and loads 406 that may be, without limitation, observed, analyzed and modified with DA system 120. Alternatively, full network model 401 may include any type or combination of utility assets appropriate for electrical power distribution system 110. Line segments 402 represent all sections of electrical power distribution system 110. Loads 406 come in various sizes, with larger loads shown as larger-diameter circles. Loads 406 represent, without limitation, the consumers of power within electrical power distribution system 110. In the exemplary embodiment, full network model 401 includes approximately 2,462 buses.

Figure 5:
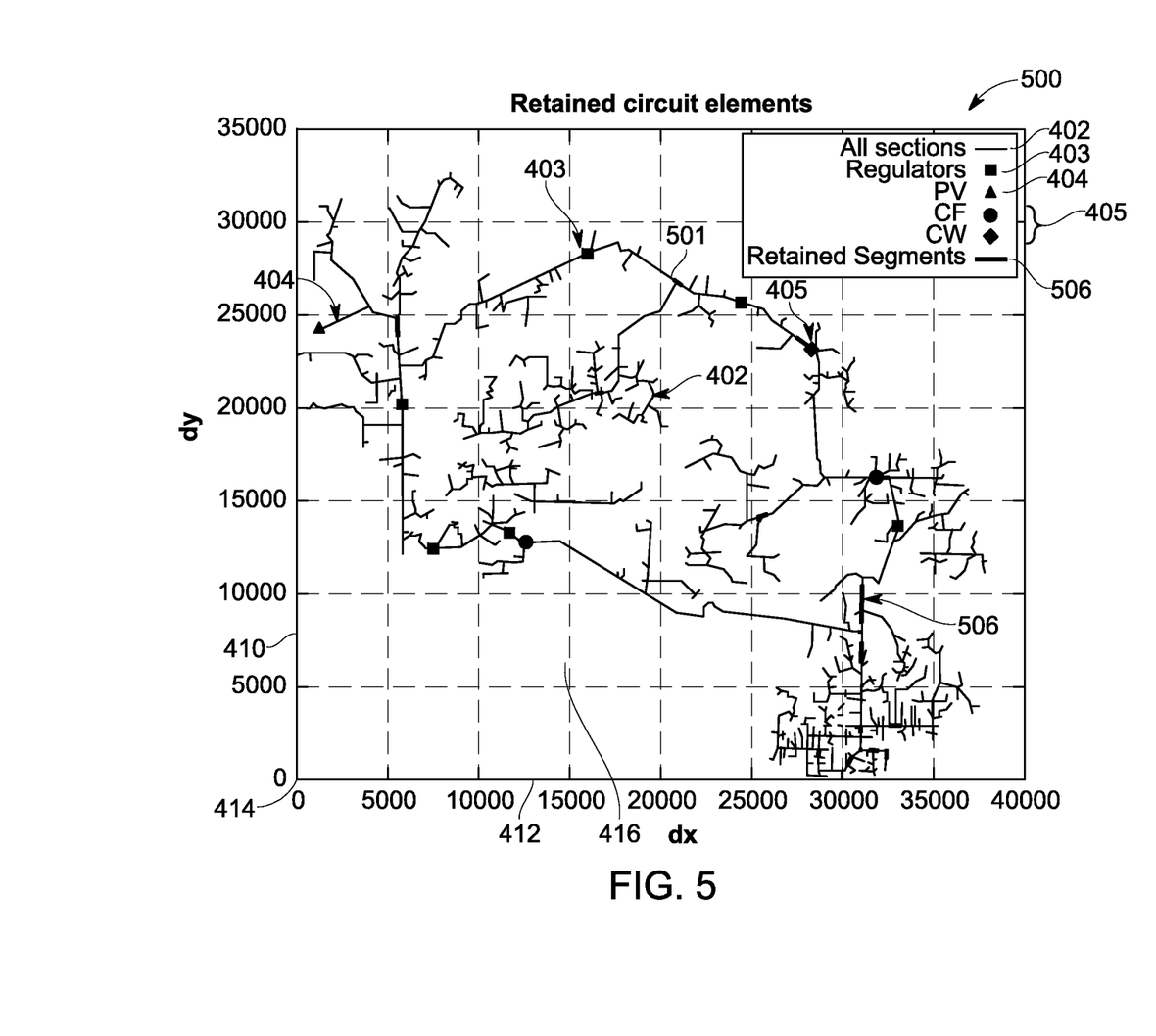
FIG. 5 is a graphical view of the electrical power distribution system shown in FIG. 1 as represented by the full network model shown in FIG. 4, but including only certain retained circuit elements.

FIG. 5 is an exemplary graphical view 500 of electrical power distribution system 110 (shown in FIG. 1) as represented by full network model 401 (shown in FIG. 4), but including only certain retained circuit elements. FIG. 5 is an interim model 501 of electrical power distribution system 110 generated while creating a reduced network model 206 (shown in FIG. 3) by preparation module 202 (shown in FIG. 3). For illustrative purposes, FIG. 5 shows all of the sections 402 of full network model 401, though they are not included as a part of interim model 501. Interim model 501 includes a subset of electrical equipment from full network model 401. Interim model 501 includes regulators 403, photovoltaic power generator 404, and capacitors 405 from full network model 401. Interim model 501 also includes retained segments 506, representing significant individual segments. Retained segments 506 represent segments with significant losses and significant voltage drop. In some embodiments, a threshold value for losses and voltage drop may be used to identify significant segments. For example, and without limitation, all segments that contribute to 50% of the total system losses may be retained, and segments which have a voltage drop of more than 0.01 per unit may be retained, i.e., voltage drop that is 1% of the normal system voltage. In some embodiments, user 156 (shown in FIG. 2) may input these thresholds. The utility assets retained at this stage represent components so significant in the network that they are retained without reduction. Alternatively, any subset of utility assets within full network model 401 which facilitates model reduction may be retained.

Figure 6:
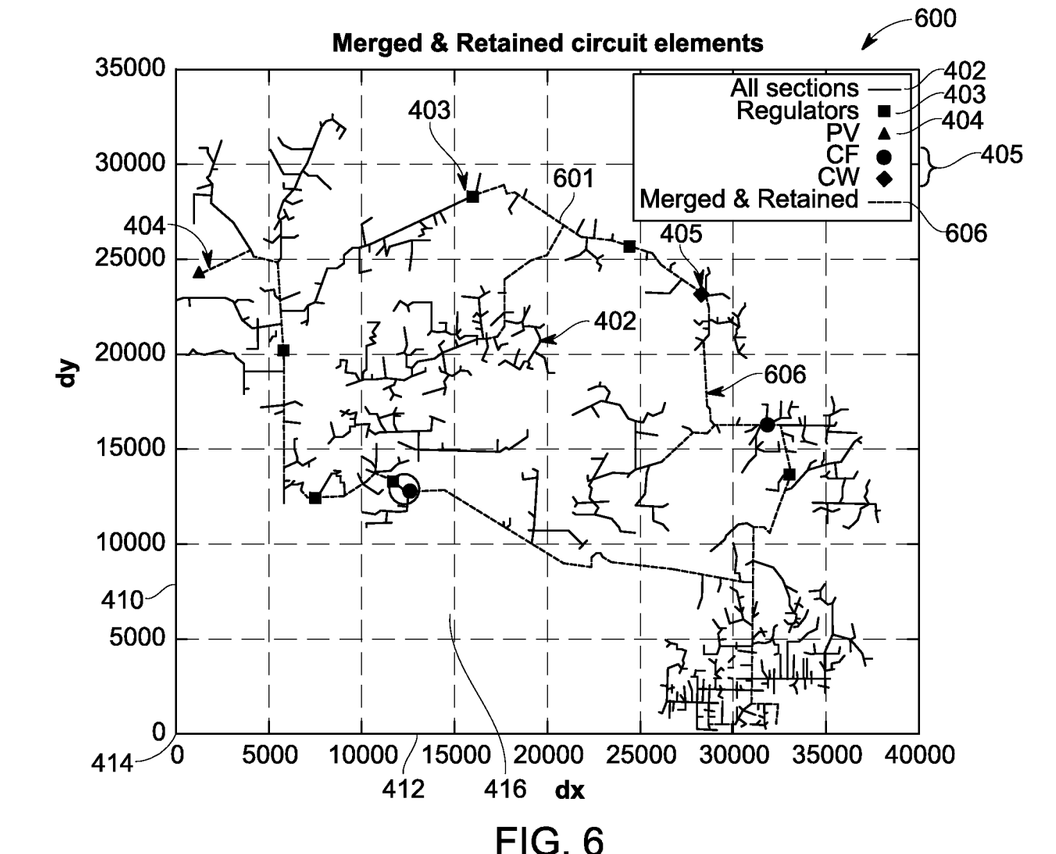
FIG. 6 is a graphical view of the electrical power distribution system shown in FIG. 1 as represented by the full network model shown in FIG. 4, but including the retained circuit elements of FIG. 5, and further including merged bus segments.

FIG. 6 is a graphical view 600 of electrical power distribution system 110 (shown in FIG. 1) as represented by full network model 401 (shown in FIG. 4), but shows an interim model 601 including the retained circuit elements of FIG. 5, and further including merged and retained bus segments 606. FIG. 6 represents a continuation of the creation of a reduced network model that was started in FIG. 5. For illustrative purposes, FIG. 6 shows all of the sections 402 of full network model 401, though they are not included as a part of interim model 601. FIG. 6 includes many of the same circuit elements as FIG. 5, including regulators 403, photovoltaic power generator 404, and capacitors 405. But additionally, interim model 601 further includes merged and retained bus segments 606. Segments between two retained segments 506 (shown in FIG. 5) are merged in a process whereby the impedances of multiple segments are combined into one. The losses of the insignificant laterals are also transferred to these line segments. Each merged and retained segment 606 represents an aggregation of numerous segments into a single segment, which, computationally, will serve to approximate the actions and responses of the numerous smaller segments, thereby aggregating the network without consideration of load.

Figure 7:
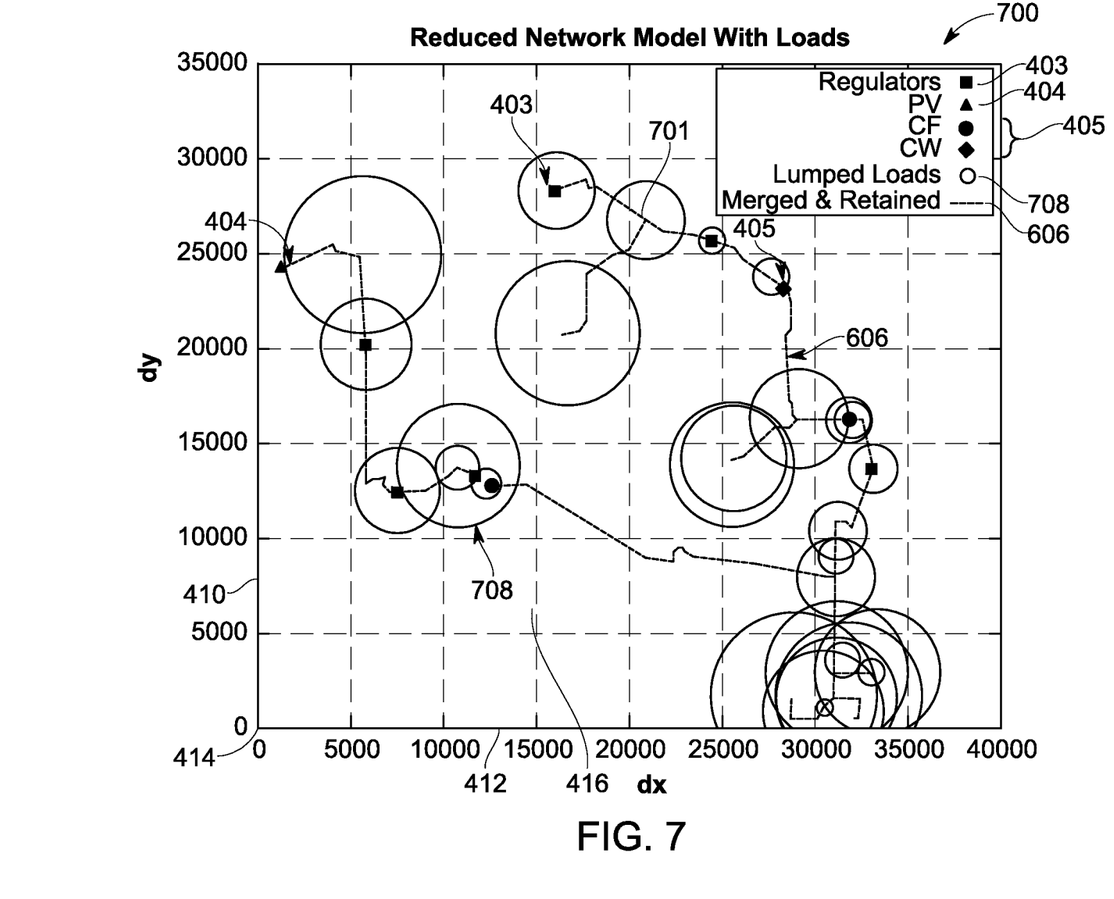
FIG. 7 is a graphical view showing an exemplary reduced network model of the electrical power distribution system shown in FIG. 1 as represented by the full network model shown in FIG. 4, with the model modifications shown in FIGS. 5 and 6, and further including lumped loads.

FIG. 7 is a graphical view 700 showing an exemplary reduced network model 701 of electrical power distribution system 110 (shown in FIG. 1) as represented by full network model 401 (shown in FIG. 4), with the model modifications shown in FIGS. 5 and 6, and further including lumped loads 708. FIG. 7, and more specifically reduced network model 701, represents the final result of the process that was started in FIG. 5. FIG. 7 includes many of the same circuit elements as FIGS. 5 and 6, including regulators 403, photovoltaic power generator 404, and capacitors 405, and merged and retained segments 606. Additionally, FIG. 7 further includes lumped loads 708. Each lumped load 708 represents one or more individual loads aggregated into a single large load. Lumped loads 708 come in various sizes, with larger loads shown as larger-diameter circles. The lumping step uses a threshold value to limit lumping, such as, without limitation, allowing no more than 5% of total load to accumulate under a single lumped load 708. In some embodiments, user 156 (shown in FIG. 2) may input this threshold value. In the exemplary embodiment, load aggregation is started from a leaf node or end node, i.e., a child node. The load at the child node is transferred to its parent node, and the segment between the parent node and child node is excluded from the network. This process continues until the total accumulated load becomes more than a threshold, or until a retained segment is reached, eliminating the insignificant laterals from the system. Unlike a traditional "Wards method" approach, the lumped loads are not bundled with network impedances. This approach allows the load in the reduced network model to be adjusted without requiring recreation of new reduced network models.

In the exemplary embodiment, FIG. 7 shows the final reduced network model 701, which includes regulators 403, photovoltaic power generator 404, capacitors 405, merged and retained segments 606, and lumped loads 708. For illustrative purposes, FIG. 7 shows only the retained elements of the reduced network model 701, and does not show all sections 402 (shown in FIGS. 4-6). Full network model 401 has been reduced by preparation module 202 (shown in FIG. 3) from approximately 2,462 buses, as shown in FIG. 4, down to approximately 53 buses as represented by reduced network model 701 in FIG. 7.

In the exemplary embodiment, FIGS. 4-7 are visual representations of network models stored in data structures within memory device 150 of DA system 120. As used herein, the phrases "full network model", "first network model", "interim model", and "reduced network model", and any other references to models are used, without limitation, to either refer to the models themselves, as logically represented in memory device 150 (shown in FIG. 2), or to their visual representations as they may be displayed on presentation interface 154 (shown in FIG. 2).

Figure 8:
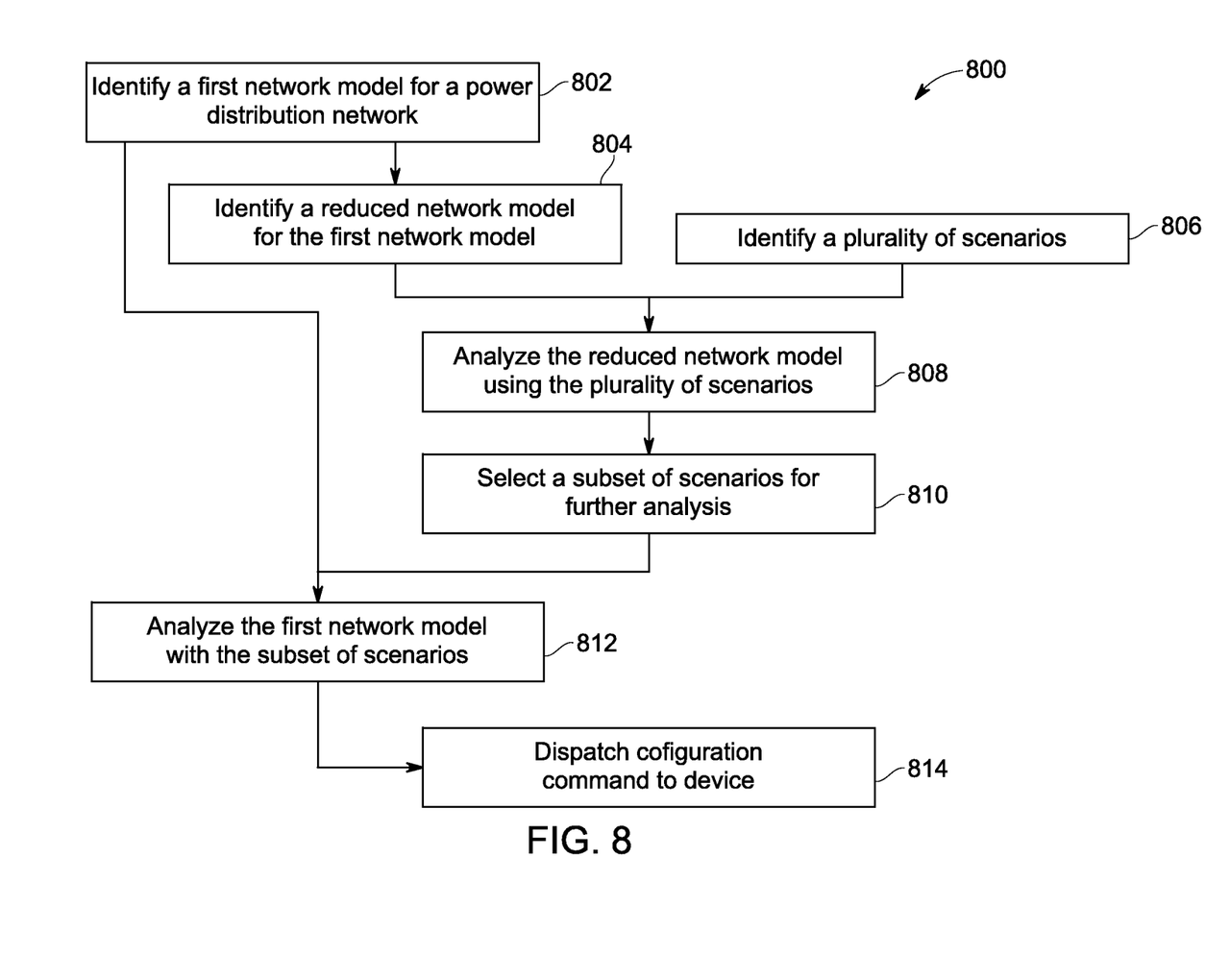
FIG. 8 is a flow chart of an exemplary method of accelerated assessment of operational uncertainties in the electrical power distribution system shown in FIG. 1 using the distribution analysis system shown in FIG. 2.

FIG. 8 is a flowchart of an exemplary method 800 of accelerated assessment of operational uncertainties in electrical power distribution system 110 (shown in FIG. 1) using distribution analysis system 120 (shown in FIG. 2). Full network model 401 (shown in FIG. 4) for electrical power distribution system 110 (shown in FIG. 1) is identified 802. Electrical power distribution system 110 is virtualized as a model in data structures within a computer system such as DA system 120 to facilitate computation and display. Reduced network model 701 (shown in FIG. 7) for electrical power distribution system 110 is identified 804. In the exemplary embodiment, the reduced network model is constructed in a multi-step process graphically illustrated in FIGS. 5-7, and described above. Alternatively, any reduction technique appropriate for distribution networks that enables operation of the systems and methods described herein may be used.

Also, in the exemplary embodiment, a plurality of scenarios 210 (shown in FIG. 3) to be analyzed are identified 806 by input module 208 (shown in FIG. 3). In some embodiments, scenario variables used are the output value of any electric power generator within the distribution network, faults occurring within particular feeders, certain configurations of switches within the distribution network, uncertainty due to circuit load, or certain individual loads or aggregate loads rising or falling to specific values or percentages of their forecasted values. Alternatively, any other scenario variables associated with an electric power distribution system that enables operation of the systems and methods described herein may be used. For example, and without limitation, a scenario variable may be a particular DG such as photovoltaic power generator 404 (shown in FIG. 4) operating at a particular output value, such as 20% of max output value. In a further example, and without limitation, a scenario variable may include a load scenario such that loads 406 (shown in FIG. 4) are drawing power at a particular value. In some embodiments, the plurality of scenarios is identified 806 by user 156 (shown in FIG. 1). In other embodiments, the plurality of scenarios includes scenario data received from user 156, or stored in memory device 150 (shown in FIG. 1), or calculated by processor 152 (shown in FIG. 1). Alternatively, any other way of identifying 806 scenario variables that enables operation of the systems and methods described herein may be used.

Further, in the exemplary embodiment, the scenarios are analyzed 808 by reduced-model-analysis module 212 (shown in FIG. 3) with reduced network model 701. In operation, analysis of reduced network model 701 approximates how the plurality of scenarios each affect a parameter within electrical power distribution system 110, including, without limitation, how many buses' voltage goes out of tolerance, and whether line losses or reactive power flows have increased or decreased.

Moreover, in the exemplary embodiment, a subset of scenarios is selected 810 for further analysis by reduced-model-analysis module 212. In some embodiments, the subset of scenarios is sorted, based on performance objective. A performance objective may be defined, for example, and without limitation, as a tolerance level on bus voltage levels or a tolerance level on line losses or reactive power flow. In operation, the operator, user 156 (shown in FIG. 1), selects 810 the most challenging scenarios in terms of the performance objective. The subset of scenarios selected 810 are then analyzed 812 by full-model-analysis module 214 (shown in FIG. 3) with full network model 401. With the results of full network model analysis 812, configuration commands are dispatched 814 by command module 216 (shown in FIG. 3) to a utility asset 200 (shown in FIG. 3) by user 156. In some embodiments, utility assets 200 may accept dispatched 814 configuration commands from DA system 120 (shown in FIG. 2) through, without limitation, communications interface 160 (shown in FIG. 2). Other devices may not be able to accept configuration commands from DA system 120, and thus must have a human operator dispatched 814 to apply configuration commands to device.

Figure 9:
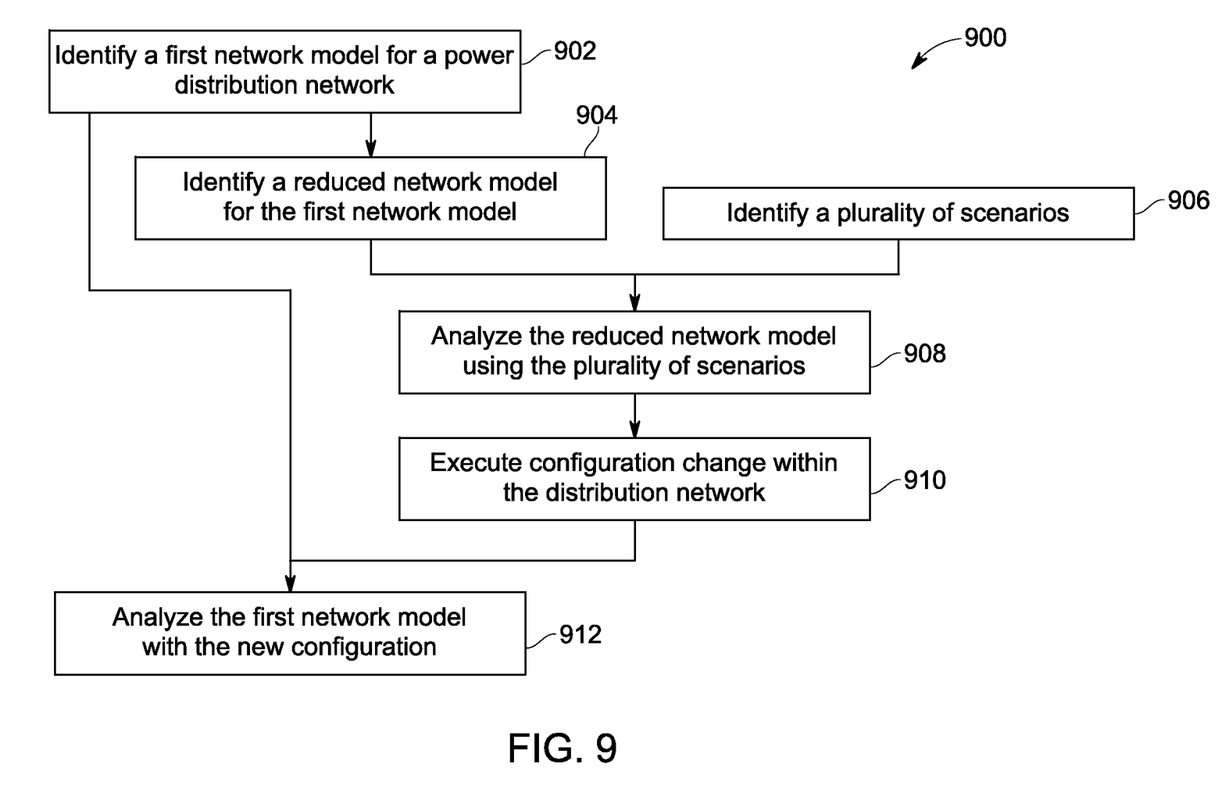
FIG. 9 is a flow chart of another exemplary method of accelerated assessment of operational uncertainties in the electrical power distribution system shown in FIG. 1 using the distribution analysis system shown in FIG. 2.

FIG. 9 is a flow chart of another exemplary method 900 of accelerated assessment of operational uncertainties in electrical power distribution system 110 (shown in FIG. 1) using distribution analysis system 120 (shown in FIG. 2). Full network model 401 (shown in FIG. 4) for electrical power distribution system 110 is identified 902 by preparation module 202 (shown in FIG. 3). Electrical power distribution system 110 is virtualized as a model in data structures within a computer system such as DA system 120 to facilitate computation and display. Reduced network model 701 (shown in FIG. 7) for electrical power distribution system 110 is identified 904 by preparation module 202. In the exemplary embodiment, reduced network model 701 (shown in FIG. 7) is constructed in a multi-step process graphically illustrated in FIGS. 5-7, and described above. Alternatively, any reduction technique appropriate for distribution networks that enables operation of the systems and methods described herein may be used.

Also, in the exemplary embodiment, a plurality of scenarios 210 (shown in FIG. 3) to be analyzed are identified 906 by input module 208 (shown in FIG. 3) and then analyzed 908 using reduced network model 701 by reduced-model-analysis module 212 (shown in FIG. 3). In some embodiments, iterative methods may be used to identify the pluralities of scenarios for analysis. For example, without limitation, the Monte Carlo method may be used to select several random sets of variables to analyze a scenario for a given performance objective. Iterative methods may be used numerous times in a given scenario, to quantify the performance of that scenario.

Further, in the exemplary embodiment, after analysis 908, a configuration change to electrical power distribution system 110 is executed 910. A configuration change includes, for example, without limitation, installation of a utility asset, and installation of one or more line segments. In operation, an operator in a planning phase may wish to analyze electrical power distribution network 110 using an iterative method such as the Monte Carlo method. This method is computationally expensive due to its numerous iterations needed to aggregate and achieve a reasonably representative approximation. Using reduced order model 701, the operator may execute hundreds or thousands of iterations, allowing convergence on a representative approximation using just the reduced model.

Moreover, in the exemplary embodiment, full network model 401 is analyzed 912 by full-model-analysis module 214 (shown in FIG. 3) with at least the results of the reduced network model analysis. In some embodiments, execution 910 is performed after analysis 908 of the reduced model. In other embodiments, execution 910 is performed after full network model 401 analysis 912. In operation, the operator can perform actions in the planning stage to reinforce electrical power distribution system 110 executing a configuration change, such as, without limitation, installing a utility a voltage regulator or a capacitor bank, or installing one or more additional line segments.

Figure 10:
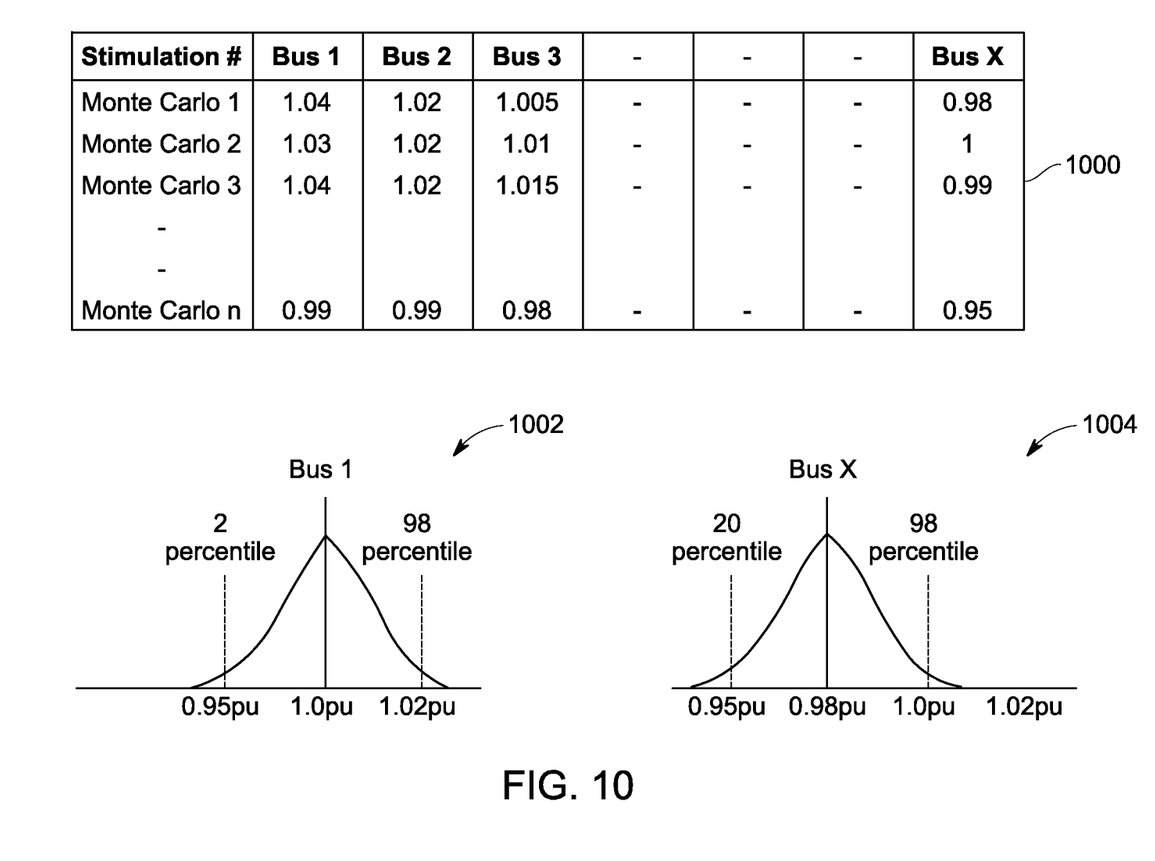
FIG. 10 is a table of an exemplary list of evaluation scenarios to be analyzed with a reduced network model as shown in FIG. 7, along with associated resulting distribution graphs.

FIG. 10 is a table 1000 of an exemplary list of evaluation scenarios to be analyzed with reduced network model 701 (shown in FIG. 7), along with associated resulting distribution graphs 1002, 1004. The Monte Carlo method is analyzed using X buses, for n iterations. At each iteration, each Bus 1 to Bus X is assigned a random load value from its own load profile and range of uncertainty. A power flow is then run, outputting the voltage expected on each bus. This simulation is repeated n times, creating a distribution of voltages expected, from each of the n random scenarios, for each individual bus. Distribution graph 1002 shows a voltage distribution for Bus 1, and distribution graph 1004 shows a voltage distribution for Bus X. In operation, such an analysis helps the grid planner to make an informed decision on installation of a voltage regulator or a capacitor bank at or in the vicinity of Bus X in order to improve the voltage profile, or otherwise improve on the performance objective. Alternatively, the grid planner may also plan on reinforcing the capacity of the line with the objective of improving the voltage profile, or otherwise improving on the performance objective.

In operation, in the exemplary embodiment, a grid operator working under operational time constraints may benefit by quickly assessing the capability of distribution feeders to handle load transfer after a fault has occurred on a nearby distribution feeder. Reduced circuit analysis may inform the grid operator on the load that may be picked by the adjacent feeders while still maintaining a specified performance objective, such as limits on bus voltages or line losses.

The above-described system and method provides a time saving analysis. During operational analysis of electrical power distribution systems, time is a factor. During planning analysis of electrical power distribution systems, certain iterative and computational techniques may be computationally prohibitive when using a only full network model. A reduced network model allows for quicker simulation. The time required to run a simulation is proportional to the number of buses in the network. The embodiments described herein facilitate analysis of an approximately 2,462 bus network by analyzing a reduced network model of using an approximately 53 bus network simulation. This reduction greatly reduces the time needed to simulate scenarios, enabling an operator's investigation of numerous scenarios feasible, and facilitating responsiveness required when dealing with faults during real-world operations. Loads are not bundled with network impedances, so the reduced network model may be examined with different loading scenarios, or used for Monte Carlo-type studies. The inaccuracies that may have been introduced with the use of reduced network models may be at least partially overcome with a final analysis of a select few scenarios with the full network model.

An exemplary technical effect of the methods, and systems described herein includes at least one of: (a) increased speed through the use of reduced network model simulations; (b) increased breadth of coverage through the numerous scenarios operators run with a reduced network model in the time it would have taken to run a single simulation with a full model; and (c) greater accuracy through scenario selection and full-model analysis of the select few scenarios of most interest after the reduced-model analysis.

Exemplary embodiments of systems and methods for accelerated assessment of operational uncertainties in electrical power distribution systems are described above in detail. The systems and methods described herein are not limited to the specific embodiments described herein, but rather, components of systems and/or steps of the methods may be utilized independently and separately from other components and/or steps described herein. For example, the methods may also be used in combination with other systems requiring concept extraction systems and methods, and are not limited to practice with only the text processing system and concept extraction system and methods as described herein. Rather, the exemplary embodiments can be implemented and utilized in connection with many other distribution analysis systems.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for accelerated assessment of operational uncertainties in an electrical power distribution network, said system for accelerated assessment of operational uncertainties comprising:
   a plurality of utility assets; and
   a distribution analysis system comprising:
      a preparation module configured to:
         identify a first network model for the electrical power distribution network wherein the first network model includes a plurality of segments and a plurality of loads coupled to the plurality of segments, each segment of the plurality of segments having an impedance; and
         identify a reduced network model for the electrical power distribution network, the reduced network model including an aggregation of the plurality of segments and a combination of the associated impedances, the plurality of segments including at least two retained segments and merged segments between the at least two retained segments, the at least two retained segments and the merged segments aggregated into a single segment, whereby the impedances of the at least two retained segments and the impedances of the merged segments are combined into one impedance and the reduced network model further including a plurality of lumped loads, wherein each lumped load of the plurality of lumped loads represents one or more individual loads aggregated into a single load, wherein the plurality of lumped loads are not bundled with the plurality of impedances and facilitate examination of the reduced network model with different loading scenarios;
      an input module configured to identify a plurality of scenarios;
      a reduced-model-analysis module configured to:
         analyze the reduced network model using the plurality of scenarios, thereby generating a first set of results; and
         select a subset of scenarios from the plurality of scenarios at least partially based on the first set of results;
      a full-model-analysis module configured to analyze the first network model using the subset of scenarios, thereby generating a second set of results; and
      a command module configured to dispatch at least one configuration command to at least one of the plurality of utility assets at least partially based on the second set of results.

2. The system for accelerated assessment of operational uncertainties in accordance with claim 1, wherein said plurality of utility assets includes at least one electrical power generator.

3. The system for accelerated assessment of operational uncertainties in accordance with claim 2, wherein the plurality of scenarios includes at least one output parameter of the at least one electrical power generator.

4. The system for accelerated assessment of operational uncertainties in accordance with claim 1, wherein the plurality of scenarios includes at least one of uncertainty due to circuit load, uncertainty due to power output of a utility asset, a switch configuration within the electrical power distribution network, and a fault occurring within the electrical power distribution network.

5. The system for accelerated assessment of operational uncertainties in accordance with claim 1, wherein said reduced-model-analysis module is further configured to select the subset of scenarios at least partially based on an electrical property of the electrical power distribution network.

6. The system for accelerated assessment of operational uncertainties in accordance with claim 1, wherein said command module is further configured to dispatch the at least one configuration command at least partially based on inputs received from a user.

7. The system for accelerated assessment of operational uncertainties in accordance with claim 1, wherein the configuration command includes changing configuration of one or more utility assets of said plurality of utility assets to accomplish one of balancing load among line segments, balancing a voltage profile, and reducing losses.

8. A method for accelerated assessment of operational uncertainties in an electrical power distribution network, the electrical power distribution network including a plurality of utility assets, a plurality of segments and a plurality of loads coupled to the plurality of segments, each segment of the plurality of segments having an impedance, said method comprising:
   identifying a first network model for the electrical power distribution network;
   identifying a reduced network model for the electrical power distribution network comprising:
      aggregating at least two retained segments of the plurality of segments and merged segments therebetween;
      combining the associated impedances of the two retained segments and the merged segments;
      lumping the plurality of loads to define a plurality of lumped loads; and
      aggregating the plurality of lumped loads such that the plurality of lumped loads is not bundled with the plurality of impedances, thereby facilitating examination of the reduced network model with different loading scenarios;
   identifying a plurality of scenarios;
   analyzing the reduced network model using the plurality of scenarios, thereby generating a first set of results;
   selecting a subset of scenarios from the plurality of scenarios at least partially based on the first set of results;
   analyzing the first network model using the subset of scenarios, thereby generating a second set of results; and
   dispatching at least one configuration command to at least one utility asset of the plurality of utility assets at least partially based on the second set of results.

9. The method in accordance with claim 8, wherein said identifying a first network model includes identifying a first network model including at least one electrical power generator.

10. The method in accordance with claim 9, wherein said identifying a plurality of scenarios includes identifying a plurality of scenarios including at least one output parameter of the at least one electrical power generator.

11. The method in accordance with claim 8, wherein said identifying a plurality of scenarios includes identifying a plurality of scenarios including at least one of uncertainty due to circuit load, uncertainty due to power output of a utility asset, a switch configuration within the electrical power distribution network, and a fault occurring within the electrical power distribution network.

12. The method in accordance with claim 8, wherein said selecting a subset of scenarios includes selecting a subset of scenarios at least partially based on an electrical property of the electrical power distribution network.

13. The method in accordance with claim 8, wherein said dispatching at least one configuration command is at least partially based on inputs received from a user.

14. The method in accordance with claim 8, wherein said dispatching at least one configuration command includes changing configuration of one or more utility assets of the plurality of utility assets to accomplish one of balancing load among line segments, balancing a voltage profile, and reducing losses.

15. The method in accordance with claim 8, wherein said identifying a reduced network model comprises creating the reduced network model comprising combining the impedances without consideration of the plurality of lumped loads.

16. A method for accelerated assessment of operational uncertainties in an electrical power distribution network, the electrical power distribution network including a plurality of utility assets, a plurality of segments and a plurality of loads coupled to the plurality of segments, each segment of the plurality of segments having an impedance, said method comprising:
  identifying a reduced network model for the electrical power distribution network comprising:
    aggregating at least a portion of the plurality of impedances; and
  identifying a reduced network model for the electrical power distribution network comprising:
    aggregating at least two retained segments of the plurality of segments and merged segments therebetween;
    combining the associated impedances of the two retained segments and the merged segments;
    lumping the plurality of loads to define a plurality of lumped loads; and
    aggregating the plurality of lumped loads such that the plurality of lumped loads is not bundled with the plurality of impedances, thereby facilitating examination of the reduced network model with different loading scenarios;
  identifying a plurality of scenarios;
  analyzing the reduced network model using the plurality of scenarios, thereby generating a first set of results; and
  executing a configuration change within the electrical power distribution network based at least in part on the first set of results.

17. The method in accordance with claim 16, further comprising:
  identifying a first network model for the electrical power distribution network; and
  analyzing the first network model including the configuration change, using a subset of the plurality of scenarios.

18. The method in accordance with claim 16, wherein said executing a configuration change within the electrical power distribution network includes one of installing of a utility asset and installing of one or more line segments.

19. The method in accordance with claim 16, wherein said identifying a plurality of scenarios comprises utilizing a Monte Carlo method.

20. The method in accordance with claim 16, wherein said identifying a reduced network model comprises creating the reduced network model comprising combining the impedances without consideration of the plurality of lumped loads.

21. The method in accordance with claim 16, wherein the plurality of loads includes a child node and a parent node, said lumping the plurality of loads comprises transferring the child node into the parent node and excluding the one segment from the reduced network model.

22. The method in accordance with claim 16, wherein said lumping the plurality of loads comprises lumping the plurality of loads until one of a predetermined threshold value of lumped loads is met or a retained segment of the reduced network model is reached, the threshold value configured to limit load lumping into each aggregation of loads.

* * * * *